(12) United States Patent
Tjeenk Willink et al.

(10) Patent No.: US 8,398,734 B2
(45) Date of Patent: Mar. 19, 2013

(54) CYCLONIC SEPARATOR WITH A VOLUTE OUTLET DUCT

(75) Inventors: Cornelis Antonie Tjeenk Willink, Rijswijk (NL); Marco Betting, Rijswijk (NL); Frederik Albert Lammers, Rijswijk (NL)

(73) Assignee: Twister B.V. (NL)

( * ) Notice: Subject to any disclaimer, the term of this patent is extended or adjusted under 35 U.S.C. 154(b) by 82 days.

(21) Appl. No.: 13/057,147

(22) PCT Filed: Aug. 1, 2008

(86) PCT No.: PCT/NL2008/050530
§ 371 (c)(1),
(2), (4) Date: Mar. 9, 2011

(87) PCT Pub. No.: WO2010/013999
PCT Pub. Date: Feb. 4, 2010

(65) Prior Publication Data
US 2011/0146216 A1 Jun. 23, 2011

(51) Int. Cl.
*B04C 5/04* (2006.01)

(52) U.S. Cl. ............. 55/460; 55/396; 55/447; 55/459.1; 55/DIG. 14; 95/269; 95/34; 95/29; 96/389; 96/380; 96/381; 210/787; 210/512.1

(58) Field of Classification Search .............. 55/396, 55/447, 459.1, 468, DIG. 14; 95/269, 34, 95/29; 96/389, 380, 381; 210/787, 512.1
See application file for complete search history.

(56) References Cited

U.S. PATENT DOCUMENTS

| 5,062,955 A | 11/1991 | Sciamanna |
| 6,958,107 B1 | 10/2005 | Clarke et al. |

FOREIGN PATENT DOCUMENTS

| GB | 2 177 951 | 2/1987 |
| WO | 03/029739 | 4/2003 |

*Primary Examiner* — Jason M Greene
*Assistant Examiner* — Dung H Bui (57) ABSTRACT

The invention relates to a cyclonic separator comprising a throat portion (4) arranged between a converging fluid inlet section and a diverging fluid outlet section, to generate a swirling fluid flow in a downstream direction. The diverging fluid outlet section comprises an inner primary outlet (7) for condensables depleted fluid components and an outer secondary outlet for condensables enriched fluid components (6). The cyclonic separator comprises a volute diffuser (9, 9') connected to one of the outlets (6, 7), which comprises a volute outlet duct (90, 90') defined by a volute axis (I1), forming a spiral shape around the central axis (I). The outlet duct (90, 90') comprises a vortex chamber 95. The vortex chamber is provided to transform axial momentum of the swirling fluid flow with respect to the central axis (I) into tangential momentum with respect to the volute axis (I1).

15 Claims, 9 Drawing Sheets

CYCLONIC SEPARATOR WITH A VOLUTE OUTLET DUCT

TECHNICAL FIELD

The invention relates to a cyclonic separator comprising a throat portion, which is arranged between a converging fluid inlet section and a diverging fluid outlet section, the cyclonic separator being arranged to generate a swirling fluid flow around a central axis of the cyclonic separator in a downstream direction through the converging fluid inlet section and the throat portion towards the diverging fluid outlet section, and the diverging fluid outlet section comprising outlets comprising an inner primary outlet for condensables depleted fluid components and an outer secondary outlet for condensables enriched fluid components.

STATE OF THE ART

WO03/029739A2 describes a cyclonic separator comprising a tubular throat portion in which the fluid stream is accelerated to a possibly supersonic speed and rapidly cooled down as a result of adiabatic expansion. The rapid cooling will cause condensation and/or solidification of condensable vapours in the fluid stream into small droplets or particles. If the fluid stream is a natural gas stream emerging from a natural gas production well then the condensable vapours may comprise water, hydrocarbons, carbon dioxide, hydrogen sulphide and mercury. These separators furthermore comprise an assembly of swirl imparting vanes in an inlet portion upstream of the throat portion, which vane or vanes are tilted or form a helix relative to a central axis of the throat portion to create a swirling motion of the fluid stream within the separator. The centrifugal forces exerted by the swirling motion on the fluid mixture will induce the relatively high density condensed and/or solidified components to swirl to the outer periphery of the interior of the throat portion and of a diverging outlet section whereas relatively low density gaseous components are concentrated near the central axis of the separator.

The gaseous components are subsequently discharged from the separator through a primary central outlet conduit, whereas the condensates enriched fluid stream is discharged from the separator through a secondary outlet which is located at the outer circumference of the diverging outlet section. A more detailed description of a cyclonic separator is described below with reference to FIG. 1.

The outlets are provided to discharge fluid flows from the cyclonic separator. The fluid outlets may be designed to decelerate the fluid and thereby transforming the kinetic energy present in the fluid flow into potential energy that is, an increase in static pressure. The cyclonic separator may also be equipped with a flow straightening device, such as an assembly of flow straightening vanes 19, to recover from the fluid rotational energy present in the swirling motion of the fluid. This rotational energy is transformed into axial kinetic energy.

In general it is advantageous to establish a low as possible pressure drop over the cyclonic separator. This may be achieved by recovering as much pressure from the kinetic energy from the fluid flow (axial as well as tangential) as possible, to facilitate further processing of the separated fluids.

WO2008/020155 describes a cyclonic separator for separating fluids which comprises an inlet chamber having means for inducing fluids flowing through the chamber to swirl around an axis, a cyclonic separation chamber connected to receive fluids from the inlet chamber, and an outlet chamber connected to receive fluids from the cyclonic separation chamber. The outlet chamber has a tangential outlet for relatively dense fluids and an axial outlet for less dense fluids.

The outlet chamber may be formed as an involute chamber including an outlet duct defined by a curved wall that extends through 360 degrees around the axis and leads to a tangential outlet conduit for heavier phases of the separated fluids. The radius of the wall increases and the cross-sectional area of the inlet duct increases towards its downstream end.

The cyclonic separator as described in WO2008/020155 is designed to operate at low fluid velocities, i.e. in the order of 50 m/s and for incompressible fluid flows. Therefore, the total kinetic energy available at the outlet to recover is relatively low. Hence, the cyclonic separator and the outlet chamber according to WO2008/020155 are not designed for processing high pressure fluids, such as an inlet pressure of 100 bar and an outlet pressure of 70 bar and processing fluid velocities that are close to the speed of sound, such as transonic velocities (0.8-1.2 Mach) or supersonic velocities (>1 Mach).

In fact, when applying an outlet chamber as described in WO2008/020155 in a cyclonic separator in which the fluids are accelerated to at least transonic velocities, the outlet chamber will not be able to process the condensables enriched 'wet' fluid components. The fluid flow will mount up in the outlet chamber, reducing the throughput and efficiency of the cyclonic separator.

In state of the art outlets the outlet flows may be deflected in such an abrupt way that—when applied to high speed flow devices—pressure loss could become excessively high, up to relative pressure losses of more than 20% of the feed pressure. In fact, the deflection of the flow may result in an adverse radial pressure profile such that near the surface of the outlet, backward flow areas occur (=flow in negative axial direction). Such a point is called a separation point, i.e. a point where the stream lines of the fluid flow become detached from the wall of the outlet. If the angle of flow deflection in said state-of-the-art outlets approaches 90° a point of zero flow velocity exists, referred to as 'stagnation point'.

Both near separation points and stagnation points, the shear of the fluid flow on the wall is relatively low, resulting in accumulation of condensed or solidified components. Such hold-up increases the chance of hydrate formation and/or for solids such as hydrates to attach to the surface. Such hydrate adhesion to the interior surface of cyclonic separators reduces the effective flow area which may decrease the throughput up to complete flow blockage and will cause an increased pressure loss, thereby decreasing the overall performance of the cyclonic separator.

Therefore, it is an object of the present invention to provide a cyclonic separator that is arranged to work more efficiently.

SHORT DESCRIPTION

According to an aspect there is provided a cyclonic separator comprising a throat portion which is arranged between a converging fluid inlet section and a diverging fluid outlet section, the cyclonic separator being arranged to generate a swirling fluid flow around a central axis of the cyclonic separator in a downstream direction through the converging fluid inlet section and the throat portion towards the diverging fluid outlet section, the diverging fluid outlet section comprising outlets comprising an inner primary outlet for condensables depleted fluid components and an outer secondary outlet for condensables enriched fluid components, the cyclonic separator comprising at least one volute diffuser connected to one of the outlets, the at least one volute diffuser comprising a volute outlet duct defined by a volute axis, the volute axis substantially forming a spiral shape around the central axis, the outlet duct comprising a vortex chamber, in use the vortex chamber is provided to transform axial momentum of the swirling fluid flow with respect to the central axis into tangential momentum with respect to the volute axis.

SHORT DESCRIPTION OF THE DRAWINGS

Embodiments will now be described, by way of example only, with reference to the accompanying schematic drawings in which corresponding reference symbols indicate corresponding parts, and in which.

DETAILED DESCRIPTION

Figure 1:
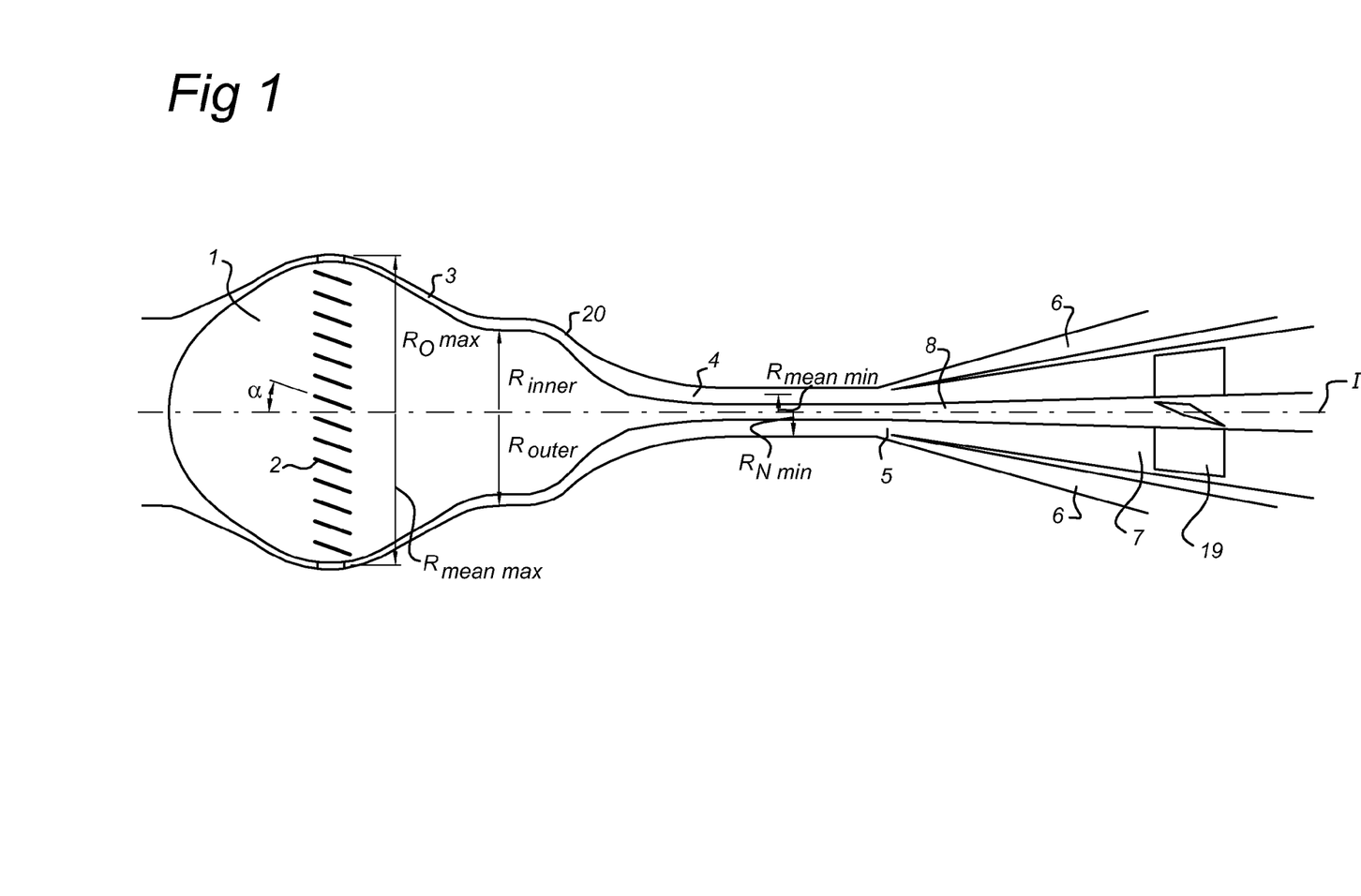
FIG. 1 schematically depicts a longitudinal sectional view of a cyclonic separator, FIG. 2 schematically depicts a longitudinal sectional view of a cyclonic separator according to an embodiment, FIG. 3 schematically depicts a cross sectional view of a cyclonic separator according to FIG. 2, FIG. 4a-4b schematically depict an enlarged detail of FIG. 2, FIG. 5 schematically depicts stream lines according to an embodiment, FIG. 6 schematically depicts shear values according to an embodiment, FIG. 7 schematically depicts a longitudinal sectional view of a cyclonic separator according to a further embodiment, FIG. 8 schematically depicts a cross sectional view of a cyclonic separator according to FIG. 7, FIG. 9 schematically depicts a cross sectional view of a cyclonic separator according to a further embodiment, FIG. 10 schematically depicts a cross sectional view of a cyclonic separator according to a further embodiment, and FIG. 11 schematically depicts a cross sectional view of a cyclonic separator according to FIG. 10.

As an example, FIG. 1 depicts a longitudinal sectional view of a fluid separator, which may also be referred to as a cyclonic separator, a cyclonic inertia separator.

Referring now to FIG. 1, there is shown a cyclonic inertia separator which comprises a swirl inlet device comprising a pear-shaped central body 1 on which a series of swirl imparting vanes 2 is mounted and which is arranged coaxial to a central axis I of the cyclonic separator and inside the cyclonic separator such that an annular flow path 3 is created between the central body 1 and separator housing 20.

The width of the annulus 3 is designed such that the cross-sectional area of the annulus gradually decreases downstream of the swirl imparting vanes 2 such that in use the fluid velocity in the annulus gradually increases and reaches a supersonic speed at a location downstream of the swirl imparting vanes.

The cyclonic separator further comprises a tubular throat portion 4 from which, in use, the swirling fluid stream is discharged into a diverging fluid separation chamber 5 which is equipped with a central primary outlet conduit 7 for gaseous components and with an outer secondary outlet conduit 6 for condensables enriched fluid components. The central body 1 has a substantially cylindrical elongate tail section 8 on which an assembly of flow straightening blades 19 is mounted. The central body 1 has a largest outer width or diameter $2R_{o\,max}$ which is larger than the smallest inner width or diameter $2R_{n\,min}$ of the tubular throat portion 4.

The various components of the cyclonic separator as shown in FIG. 1 are described below.

The swirl imparting vanes 2 which are oriented at an angle ($\alpha$) relative to the central axis I create a circulation in the fluid stream. The angle $\alpha$ may be between 20° and 60°. The fluid stream is subsequently induced to flow into the annular flow area 3.

The cross-sectional surface of this area is defined as:

$$A_{annulus} = \pi(R_{outer}^2 - R_{inner}^2)$$

The latter two being the outer radius and inner radius of the annulus at a selected location. The mean radius of the annulus at that location is defined as:

$$R_{mean} = \sqrt{[\tfrac{1}{2}(R_{outer}^2 + R_{inner}^2)]}.$$

At the maximum value of the mean annulus radius $R_{mean,\,max}$ the fluid stream is flowing between the assembly of swirl imparting vanes 2 at a velocity (U), which vanes deflect the flow direction of the fluid stream proportional to the deflection angle ($\alpha$) and so obtaining a tangential velocity component which equals $U_\phi = U \cdot \sin(\alpha)$ and an axial velocity component $U_x = U \cdot \cos(\alpha)$.

In the annular space 3 downstream of the swirl imparting vanes 2 the swirling fluid stream is expanded to high velocities, wherein the mean annulus radius is gradually decreasing from $R_{mean,\,max}$ to $R_{mean,\,min}$.

It is considered that during this annular expansion two processes occur:

(1) The heat or enthalpy (h) in the flow decreases with the amount $\Delta h = -\tfrac{1}{2}U^2$, thereby condensing those flow constituents which first reach phase equilibrium. This results in a swirling mist flow containing small liquid or solid particles.

(2) The tangential velocity component $U_\phi$ increases inversely with the mean annulus radius substantially in accordance with the equation $$U_{\phi,final} = U_{\phi,initial} \cdot (R_{mean,max} / R_{mean,min}).$$

This results in a strong increase of the centrifugal acceleration of the fluid particles ($a_c$), which will finally be in the order of:

$$a_c = (U_{\phi,final}^2 / R_{mean,min}).$$

In the tubular throat portion 4 the fluid stream may be induced to further expand to higher velocity or be kept at a substantially constant speed. In the first case condensation is ongoing and particles will gain mass. In the latter case condensation is about to stop after a defined relaxation time. In both cases the centrifugal action causes the particles to drift to the outer circumference of the flow area adjacent to the inner wall of the separator housing 20, which is called the separation area. The time period for the particles to drift to this outer circumference of the flow area determines the length of the tubular throat portion 4. It is understood that particles may include solid or solidified particles.

Downstream of the tubular throat portion 4 the condensables enriched 'wet' fluid components tend to concentrate adjacent to the inner surface of the diverging fluid separation chamber 5 and the 'dry' gaseous fluid components are concentrated at or near the central axis I, whereupon the wet condensables enriched 'wet' fluid components are discharged into an outer secondary fluid outlet 6 via one slot or a series of slots, (micro) porous portions whereas the 'dry' gaseous components are discharged into the central primary fluid outlet conduit 7.

In the diverging primary fluid outlet conduit 7 the fluid stream is further decelerated so that the remaining kinetic energy is transformed into potential energy.

The diverging primary outlet conduit may be equipped with an assembly of flow straightening means, such as flow straightening vanes 19 to recover the circulation energy.

The term fluid as used here refers to the liquid, the gaseous phase, as well as a combination of liquid and gaseous phases. Fluids as defined here could also be laden with solid particles.

The swirl imparting vanes 2 may be replaced with other suitable swirl imparting devices.

As will be understood, the cyclonic separator is substantially rotational symmetrical with respect to the central axis I.

It is emphasized that the above described cyclonic separator is just an example and the embodiments described below may also be applied in other type of cyclonic separators, such as the one discussed with reference to WO2008/020155.

EMBODIMENTS

Embodiment 1

Figure 2:
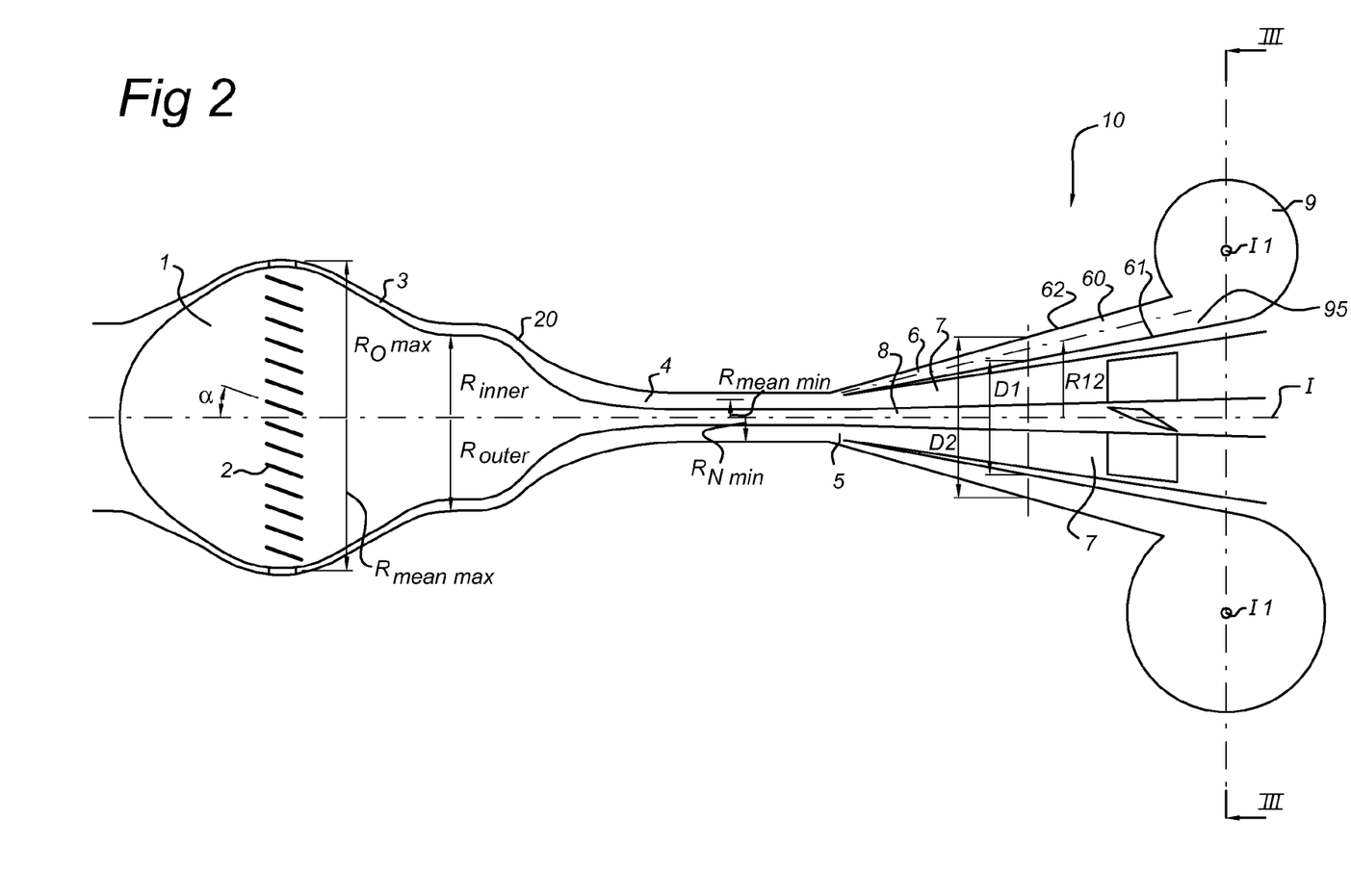
Figure 3:
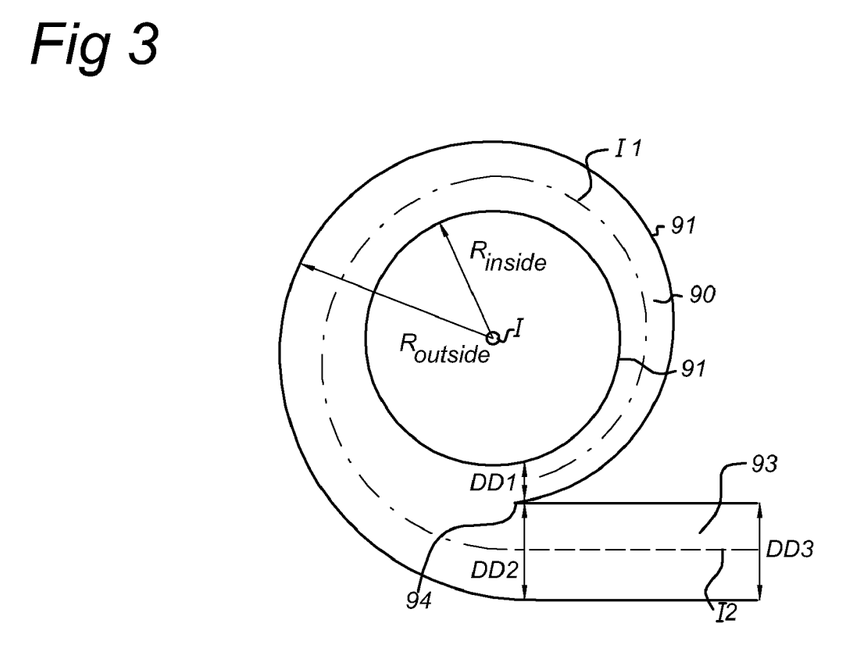

FIG. 2 shows a cyclonic separator according to an embodiment. FIG. 3 schematically depicts a cross sectional view in the upstream direction of the cyclonic separator along the dashed line shown in FIG. 2. Both FIGS. 2 and 3 schematically show a cyclonic separator according to the one shown in FIG. 1, now further comprising an annular diffuser 60 and a volute diffuser 9.

Volute Diffuser

The volute diffuser 9 comprises a volute outlet duct 90 that is provided around the central axis I of the cyclonic separator, for instance around the primary fluid outlet conduit 7, flowing out into an outlet duct 93, which may be a straight duct positioned tangential to the volute outlet duct 90. The volute outlet duct 90 can be described as a torus shaped duct, with a varying cross sectional area, as will be explained in more detail below. The shape of the cross sectional area may be circular, but may also have another suited curved shape, as will be explained below.

The volute outlet duct 90 may be formed by a wall 91. The connection of the volute diffuser 9 to one of the outlets, such as outer secondary outlet conduit 6 and may comprise an annular diffuser 60 as discussed further below. The volute outlet duct 90 is connected to the outer secondary outlet conduit 6 to further convey the secondary condensables enriched fluid flow.

According to this embodiment there is provided a cyclonic separator comprising a throat portion 4 which is arranged between a converging fluid inlet section and a diverging fluid outlet section, the cyclonic separator being arranged to generate a swirling fluid flow around a central axis I of the cyclonic separator in a downstream direction through the converging fluid inlet section and the throat portion towards the diverging fluid outlet section, the diverging fluid outlet section comprising outlets 6, 7 comprising an inner primary outlet 7 for condensables depleted fluid components and an outer secondary outlet for condensables enriched fluid components 6. The cyclonic separator comprising at least one volute diffuser 9 connected to at least one of the outlets 6, 7, the at least one volute diffuser 9 comprising a volute outlet duct 90 defined by a volute axis I1, the volute axis I1 substantially forming a spiral shape around the central axis I, the volute outlet duct 90 comprising a vortex chamber 95, in use the vortex chamber 95 being provided to transform axial momentum of the swirling fluid flow with respect to the central axis I into tangential momentum with respect to the volute axis I1. Also, radial momentum that may be present in the swirling fluid flow with respect to the central axis I may be transformed into tangential momentum with respect to the volute axis I1.

The example shown in FIGS. 2 and 3 shows a volute diffuser 9 being connected to outer secondary outlet conduit 6. According to a further embodiment described further below, the volute diffuser can also be connected to the central primary outlet conduit 7.

According to an embodiment, the outlet 6 is formed by walls 61, 62 forming an annular area, and the outlet duct 90 is formed by a wall 91 having a curvature around the volute axis I1, the vortex chamber 95 being formed by a smooth transition between at least one of the walls 61, 62 of the outlet 6 and the curved wall 91.

Figure 4A:
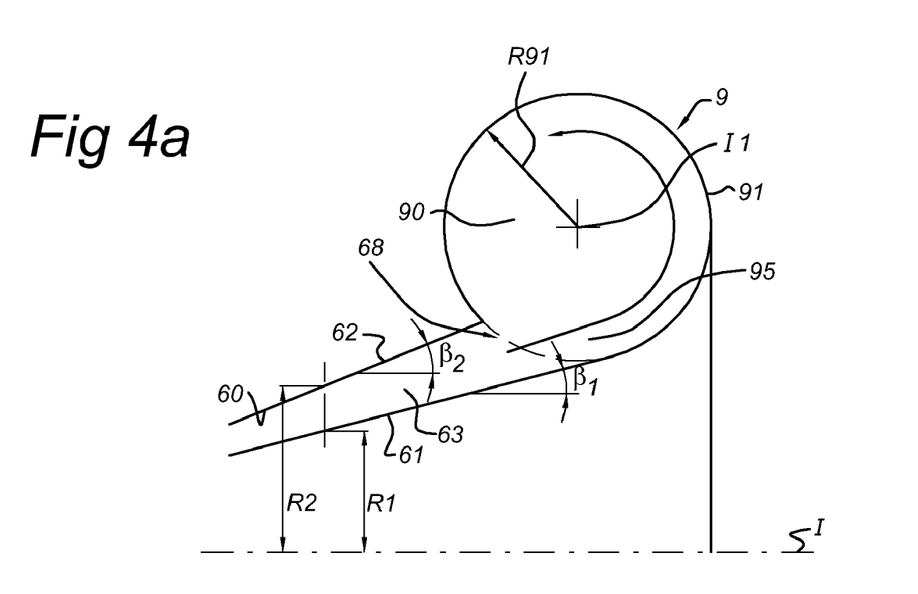

The radius of curvature of the wall 91, i.e. the distance from the volute axis I1 to the wall 91, can be constant—i.e. circular—or the radius of curvature can vary as to form a spiral-like curve. The applied radii of curvature are typically in the range of 0.05 times DD2 up to 0.5 times DD2. In FIG. 4a the radius of wall 91 with respect to the volute axis I1 is indicated with R91.

Figure 4B:
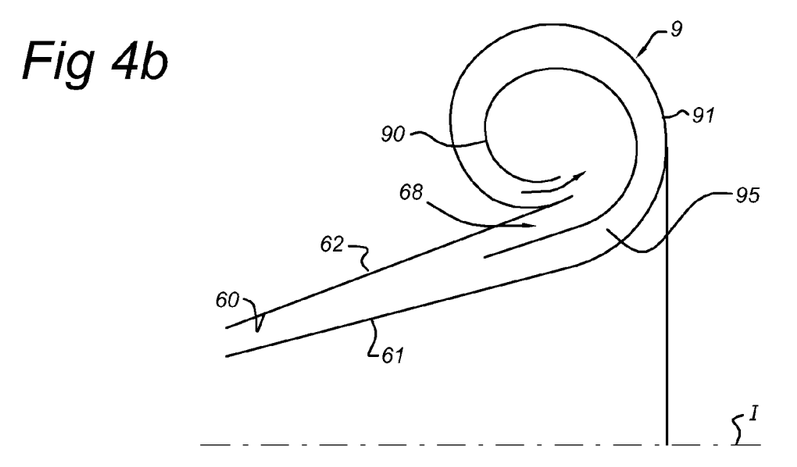

In the example shown in the figures, the curved wall 91 is a substantially circular duct, i.e. it has a substantially circular cross sectional area, where the cross section is taken substantially perpendicular to volute axis I1. An example of this is shown in FIG. 4a. In general, the cross sectional area may have any suitable curved shape, such as an elliptical shape or a spiral shape. An example of a spiral shape is shown in FIG. 4b.

The cross sectional area of the volute outlet duct 90 taken perpendicular with respect to the volute axis I1 may have a shape substantially corresponding with at least part of a circle, an ellipse, a spiral.

In use, the swirling fluid flow has a tangential momentum with respect to the central axis I and the volute axis I1 is substantially directed to match the tangential momentum with respect to the central axis I.

In other words, the volute axis I1 may be directed such that the tangential momentum with respect to the central axis I becomes "axial momentum with respect to the volute axis I1" and eventually becomes axial momentum with respect to the tangential outlet duct axis I2. The term "axial momentum with respect to volute axis I1" means that the flow when flowing through the volute outlet duct 90 swirls around the volute axis I1 defined by the volute outlet duct 90.

The volute axis I1 may be in a plane that is perpendicular with respect to the central axis I. However, according to an alternative, the volute axis I1 may have a pitch with respect to the central axis I to take into account the actual flow direction (combination of axial, tangential and possibly radial components) of the swirling flow. The pitch may be such that the volute axis I1 makes an angle up to 45 degree with respect to the central axis I.

The cross sectional area of the volute outlet duct 90 taken perpendicular with respect to the volute axis I1 increases along the volute axis I1 in the downstream direction, i.e. in the direction of the tangential outlet duct 93.

The cross sectional area of the volute outlet duct 90 increases from a minimal cross sectional area to a maximal cross sectional area, the ratio between the minimal cross sectional area and the maximum cross sectional area being at least 1:2.

In the example shown in FIG. 3, the cross sectional area is characterized by an inner diameter DD of the volute outlet duct 90. The inner diameter DD may increase (e.g. linearly) in the direction of the tangent outlet duct 93, starting at a first inner diameter DD1 being relatively small and resulting in a second inner diameter DD2, which will be equal to or smaller than the diameter DD3 of the outlet duct 93. The ratio DD1:DD2 will be typically 1:4 and is preferably between 1:2 and 1:20.

According to an embodiment, the outlet duct 93 may be diverging, i.e. have a diameter DD3 that increases in the downstream direction.

At the end of the volute outlet duct 90 the volute outlet duct 90 is connected to the outlet duct 93. This connection also substantially coincides with the beginning of the volute outlet duct 90, i.e. part of the volute outlet duct 90 having the smallest cross sectional area (e.g. at the position of inner diameter DD1). At the position where the outer perimeter of the volute outlet duct 90 meets the outlet duct 93, a passage to the minimal cross sectional area of the volute outlet duct 90 may be provided.

So, according to an embodiment, the maximum cross sectional area of the volute duct 90 comprises a passage to the minimal cross sectional area of the volute duct 90.

The passage may be formed by an edge 94. The edge 94 may be a sharp edge in order not to obstruct the flow. This construction prevents generation of an area with underpressure at the beginning of the volute outlet duct 90 and thus minimizing or preventing flow reversal in the volute.

According to an embodiment, the volute outlet duct 90 has an inside radius $R_{inside}$ with respect to the central axis I of the cyclonic separator that is substantially constant and an outside radius $R_{outside}$ with respect to the central axis I of the cyclonic separator that is increasing in the direction of the tangent outlet duct 93.

The volute outlet duct 90 comprises an opening to allow fluid to flow from the outlet 6 or the annular diffuser 60 into the volute outlet duct 90 conveying the secondary condensables enriched fluid flow.

According to an embodiment, the at least one volute diffuser 9 comprises an opening 68 at an inner perimeter of the volute duct 90 to be connected to the outlets 6 or 7 or to the annular diffuser 60, 70. This is shown in more detail in FIG. 4a, which shows an enlarged detail of FIG. 2.

It will be appreciated that according to an alternative embodiment the opening may be positioned on the outside of the volute outlet duct 90, i.e. at its outer perimeter (not shown).

The opening and the connection between the outlet 6 or the annular diffuser 60 (as described below) and the volute diffuser 9 is made in such a way that the fluid flow enters the volute outlet duct 90 substantially parallel to the curved wall 91 of the volute outlet duct 90. The outlet 6 or the annular diffuser 60 may be tangent to the wall of the volute outlet duct 90. Because of the shape of the volute outlet duct 90 and the tangent connection of the outlet or annular diffuser 60 to the volute outlet duct 90, a vortex chamber 95 is formed, which, in use transforms axial momentum of the swirling fluid flow with respect to the central axis I into tangential momentum with respect to the volute axis I1. The remaining axial momentum (with respect to the central axis I) present in the flow at the entrance of the volute outlet duct 90 is deflected smoothly by the vortex chamber 95 such that a ring shaped vortex (with respect to the volute axis I1) is established within the volute outlet duct 90 avoiding stagnation points in said volute outlet duct 90.

A substantial portion of the momentum at the entrance of the volute outlet duct 90 is in tangential direction with respect to the central axis I and is transferred to "axial momentum with respect to volute axis I1" and eventually into axial momentum with respect to axis I2 of the tangentially positioned outlet duct 93.

The curved shape of the volute outlet duct 90 allows the axial kinetic energy with respect to the central axis I of the cyclonic separator to transform smoothly and efficiently into tangential momentum with respect to the volute axis I1. The curved shape of the vortex chamber 95 of volute outlet duct 90 prevents stagnation of the fluid flow, but ensures that it is deflected into a ring shaped vortex.

So, the volute shape of the volute outlet duct 90 ensures that the rotational kinetic energy of the fluid flow is restored. The tangent connection of the outlet 6 or annular diffuser 60 to the volute outlet duct 90 ensures that the axial kinetic energy of the fluid flow is substantially transferred into rotational energy within the volute chamber. This way, hold-up of the flow is prevented, thereby reducing the over-all pressure drop over the cyclonic fluid separator.

The volute outlet duct 90 is formed to make a rotation of substantially 360° around central axis I of the cyclonic separator to allow fluid to enter the volute outlet duct 90 along the entire annular diffuser 60.

Annular Diffuser

According to an embodiment, the outlet 6 is formed as an annular diffuser 60 such that the main part of the axial component of the kinetic energy of the fluid is restored before entering the volute outlet duct 90. The annular diffuser may be provided as an extension of outer secondary outlet conduit 6. The annular diffuser 60 may comprise an inner wall 61 and an outer wall 62 as shown in FIG. 4a. Both the inner wall 61 and the outer wall 62 may be formed as part of a (truncated) cone, the axis of such a cone substantially coinciding with the central axis I.

The inner wall 61 has a first radius R1 with respect to the central axis I of the cyclonic separator and the outer wall 62 has a second radius R2 with respect to the central axis I of the cyclonic separator, where for each position along the central axis I the first radius R1 is smaller than the second radius R2. The second radius R2 and possibly also the first radius R1 increase in the downstream direction, i.e. the direction towards the volute outlet diffuser 9.

This way, an annular area 63 in between the inner wall 61 and the outer wall 62 is created. The area of this annular area 63 increases in the downstream direction, i.e. the direction towards the volute diffuser 9.

According to an embodiment, in the downstream direction the inner wall 61 is at a first angle β1 with respect to the central axis I and the outer wall is at a second angle β2 with respect to the central axis I, the first angle β1 being smaller than or equal to the second angle β2. As a result, the distance between the inner wall 61 and the outer wall 62 is increasing in the downstream direction, such that the annular area 63 increases even further in the downstream direction.

As a result of the increasing annular area 63 in the downstream direction, the fluid will decelerate and the kinetic energy of the fluid in the axial direction is reduced.

As a result of the increase of the second radius R2 and possibly the first radius R1 of the annular area 63 in the downstream direction, the effective radius of the annular diffuser increases and as a result the rotational energy of the fluid is reduced.

The annular diffuser 60 is thus shaped in such a way as to reduce the axial and the rotational kinetic energy and thereby efficiently recovering pressure from the fluid.

So based on the above an embodiment is provided whereby the connection of the at least one volute diffuser 9 to the at least one outlet 6 comprises an annular diffuser 60, the annular diffuser comprising an inner wall 61 and an outer wall 62 forming an annular area in between the inner wall 61 and the outer wall 62, whereby the annular area is increasing in the downstream direction. The increasing annular area in the downstream direction causes the fluid flow to loose axial momentum with respect to the central axis and thereby efficiently recovering pressure from the fluid.

Furthermore, the effective radius of the annular area may increases in the downstream direction. The increasing effective radius of the annular area in the downstream direction causes the fluid flow to loose tangential momentum with respect to the central axis and thereby efficiently recovering pressure from the fluid.

Combination of the annular diffuser 60 and the volute diffuser 9 provide an advantageous combination of diffusers that allow effective recovery of pressure from the momentum of the fluid flow. Also, the connection of the annular diffuser to the volute diffuser 9 is provided in such a way that an even more efficient recovery is achieved.

According to an embodiment, the outlet duct 93 comprises flow straightening means (not shown), such as flow straightening vanes or flow straightening blades, as described above. The flow straightening means may be provided to recover rotational energy around the volute axis I1 present in the motion of the fluid.

Stream Lines/Shear

Figure 5:
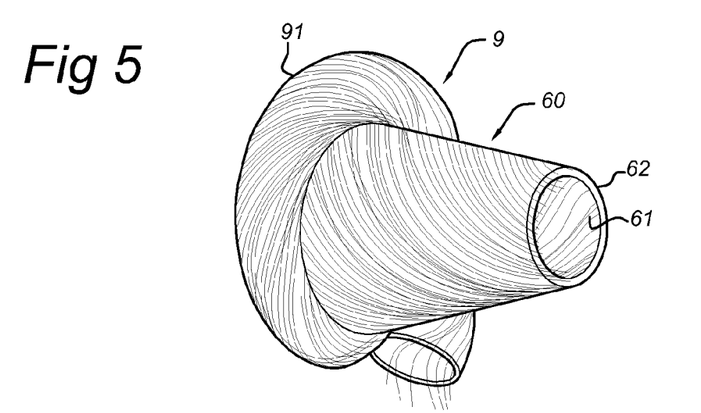

FIG. 5 schematically depicts stream lines of a fluid flow flowing through the annular diffuser 60 and the volute diffuser 9. In FIG. 5 it can be seen that the stream lines follow the walls, i.e. inner wall 61, outer wall 62, and the wall of the volute outlet duct 90.

By providing the volute outlet duct 90 with a curved wall and an opening situated in such a way that the fluid flow enters the volute outlet duct 90 substantially parallel to this curved wall, substantially unobstructed stream lines can form. As a result, no separation points or stagnation points can form and a substantial shear force is exerted on the walls of the annular diffuser 60 and the volute diffuser 9.

Figure 6:
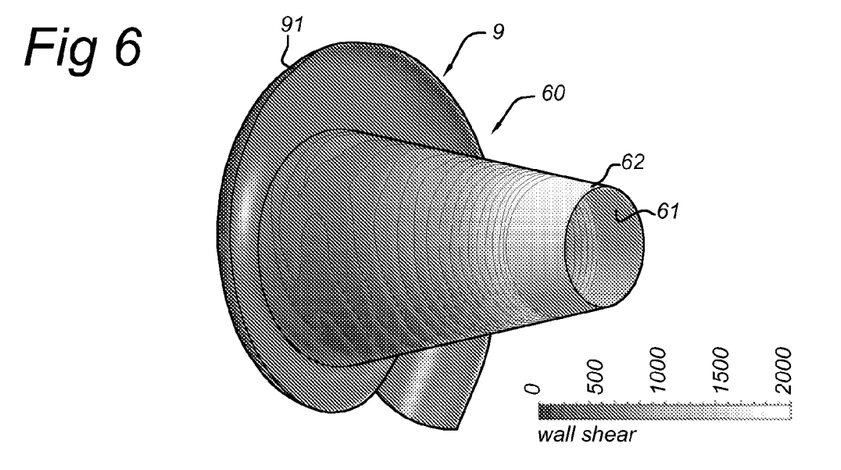

FIG. 6 schematically shows the shear of the fluid flow on the walls, i.e. inner wall 61, outer wall 62, and the wall of volute outlet duct 90 for a total fluid pressure of approximately 90 bar. FIG. 6 shows different areas having a different shear value, ranging from 2000 Pa to 400 Pa in the downstream direction. Important to note is that there are no areas with a shear below 400 Pa. As a result, the chance of hydrate adhesion is reduced. As discussed, hydrate adhesion has a negative effect on the efficiency of the cyclonic separator.

Based on the above it will be understood that the volute diffuser 9, possibly in combination with the annular diffuser 60 increases the efficiency of the cyclonic separator by creating a smaller pressure drop over the cyclonic separator. A reduction of the pressure drop may be achieved of approximately 3 bar in comparison with a prior art outlet.

As can be concluded from FIG. 5, the flow still has a certain tangential momentum when entering outlet duct 93. Outlet 93 may therefore comprise a flow straightening device, such as an assembly of flow straightening vanes similar to the slow straightening vanes 19 shown in FIG. 1.

So, the flow is guided from the annular diffuser 60, where it has an axial velocity substantially in the direction of the central axis I of the cyclonic separator and
a tangential velocity substantially with respect to the central axis I of the cyclonic separator,
into volute outlet duct 90, where it has
an axial velocity substantially in the direction of the volute axis I1 of the volute outlet duct 90 and
a tangential velocity substantially along the curved surface enclosing the volute axis I1 of the volute outlet duct 90. The volute axis I1 makes a substantially 360 degrees turn around the central axis I of the cyclonic separator. This transformation is achieved in a smooth way, without abrupt transitions, velocity changes etc.

The ratio between the entrance area of the annular diffuser 60 and the area of the tangentially positioned outlet duct 93 (DD3) may be 1:10. This is done to achieve a substantial reduction of the axial momentum of the fluid in the annular diffuser 60 and the volute diffuser 9.

Embodiment 2

Figure 7:
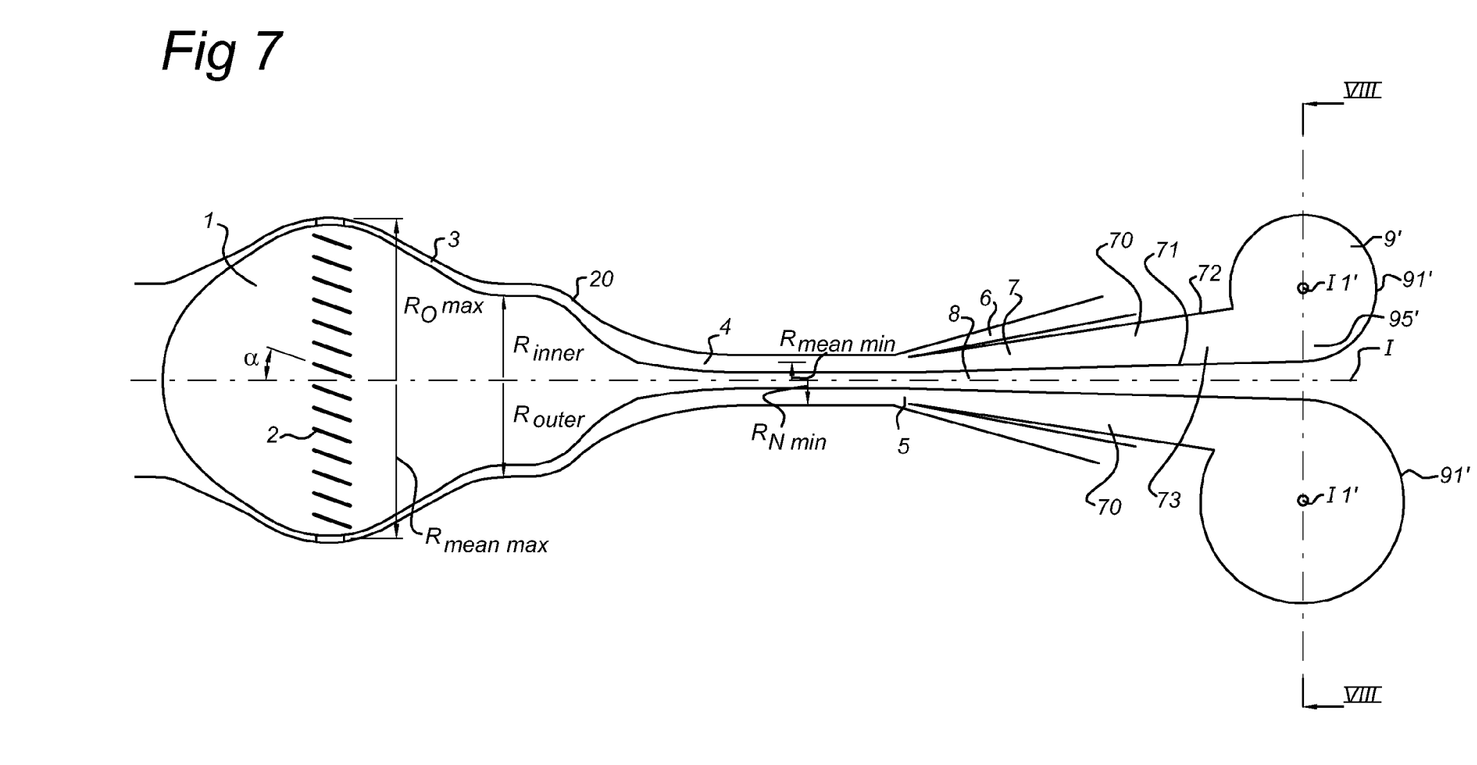
Figure 8:
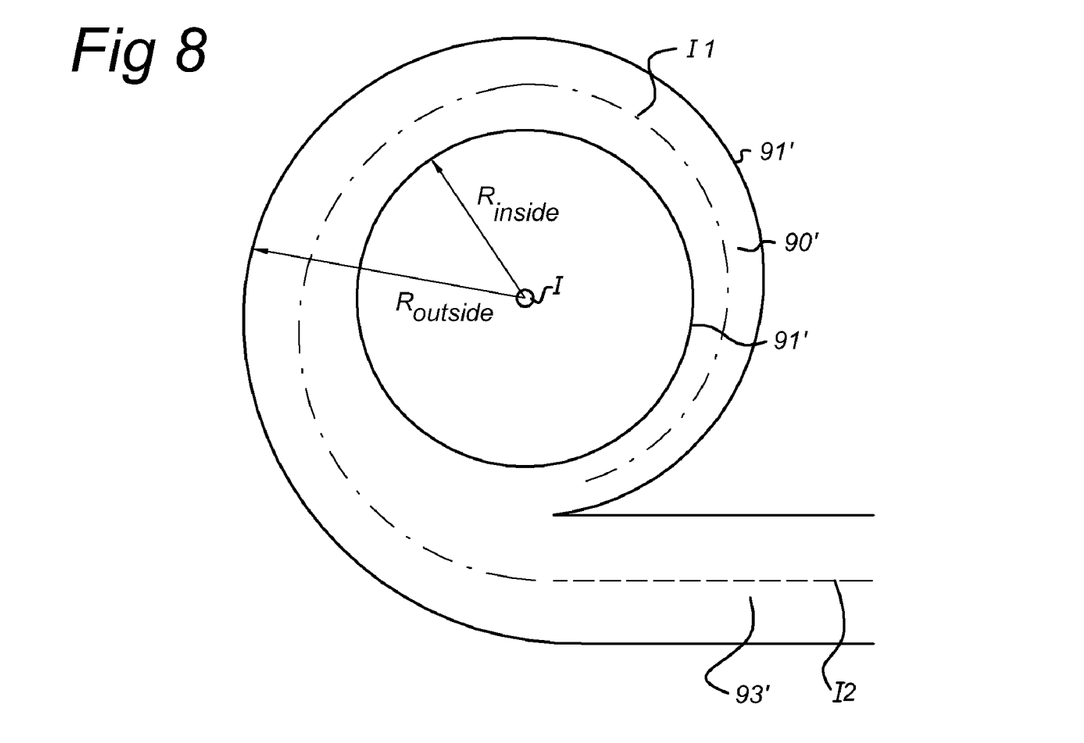

FIG. 7 shows a cyclonic separator according to a further embodiment. FIG. 8 schematically depicts a cross sectional view in the upstream direction of the cyclonic separator along the dashed line shown in FIG. 7. Both FIGS. 7 and 8 schematically show a cyclonic separator similar to the one shown in FIG. 1, now further comprising an annular diffuser 70 and a volute diffuser 9' and not comprising vanes 19.

Volute Diffuser

The volute diffuser 9' is formed by a volute outlet duct 90' that is provided around the central axis I of the cyclonic separator, flowing out into an outlet duct 93', which may be a straight duct positioned tangent to the volute outlet duct 90'.

The volute outlet duct 90' is connected to the outlet 7 or annular diffuser 70 to further convey the primary condensables depleted fluid flow. The annular diffuser 70 is discussed below in more detail.

The volute outlet duct 90' may be formed in accordance with the volute outlet duct 90 described above with reference to FIGS. 2, 3 and 4a or 4b, i.e. comprising a vortex chamber 95, in use, the vortex chamber 95 being provided to transform axial momentum of the swirling fluid flow with respect to the central axis I into tangential momentum with respect to the volute axis I1'.

As the outlet 7 (and the annular diffuser 70) and the volute diffuser 9' are now used to convey the primary condensables depleted fluid flow which is located directly around the elongated tail section 8, the value of inside radius $R_{inside}'$ may be relatively smaller compared to the embodiment described with reference to FIGS. 2, 3 and 4a. However the outside radius $R_{outside}'$ may be relatively larger compared to the embodiment described in FIGS. 2, 3 and 4, since the condensables depleted flow is normally larger than the condensable enriched flow.

Furthermore, the design of the volute diffuser 9' as shown in FIGS. 6 and 7 may be similar to the design of the volute diffuser 9 described above with respect to FIGS. 2, 3, 4a or 4b, i.e. comprising a vortex chamber 95.

Annular Diffuser

According to this embodiment, the annular diffuser 70 is formed as an extension of the central primary outlet conduit 7, or as an alternative to the central primary outlet conduit 7.

The annular diffuser 70 is provided to reduce the kinetic energy of the fluid before entering the volute outlet duct 90'. Again, the annular diffuser 70 may comprise an inner wall 71 and an outer wall 72 shown in FIG. 6. Both the inner wall 71 and the outer wall 72 may be formed as part of a (truncated) cone, the axis of such a cone substantially coinciding with the central axis I. The inner wall 71 may be formed by the elongated tail section 8. Walls 71, 72 may form an annular area, and the outlet duct 90' may be formed by a curved wall 91' having a curvature around the volute axis I1', the vortex chamber 95 being formed by a smooth transition between at least one of the walls 71, 72 of the outlet 7 and the curved wall 91'.

Again, the annular diffuser 70 may be formed to reduce both the axial as the tangential velocity of the fluid, by providing an increasing annular area 73 in the downstream direction, and an increase of the effective radius of the annular diffuser 70.

Embodiment 3

Figure 9:
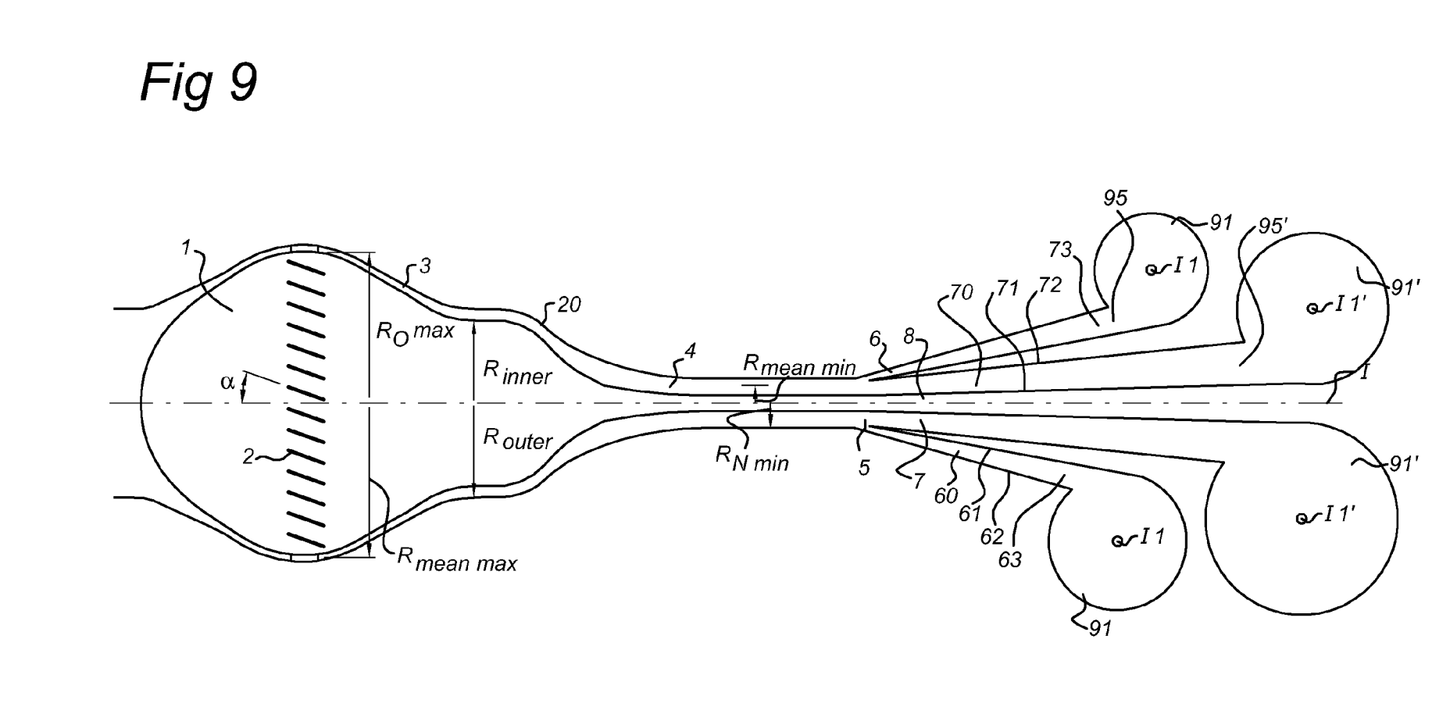

FIG. 9 schematically shows a combination of the embodiments described above. According to this embodiment a cyclonic separator is provided comprising a volute diffuser for both the inner primary outlet 7 for condensables depleted fluid components and the outer secondary outlet for condensables enriched fluid components 6.

Embodiment 4

Figure 10:
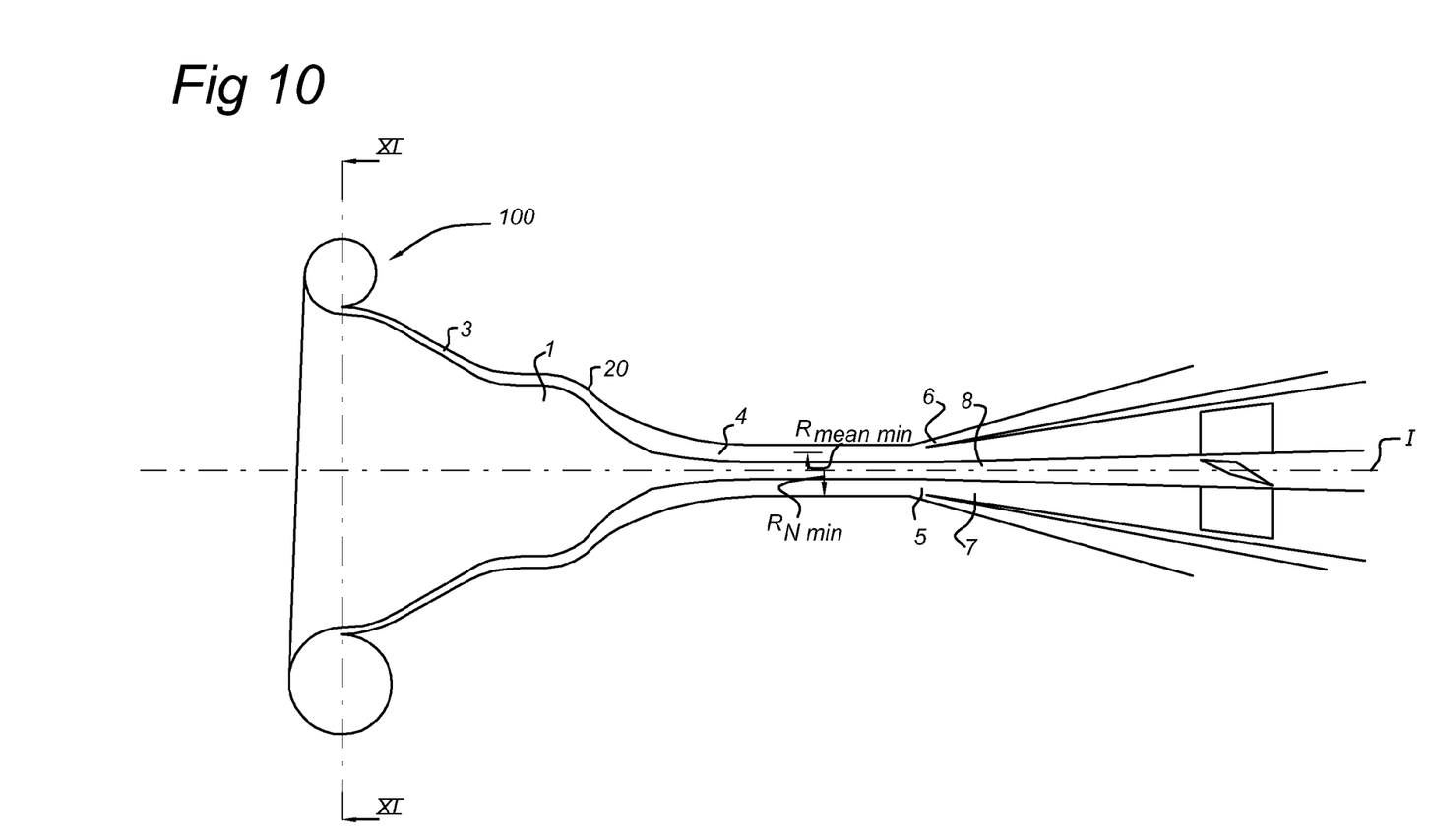
Figure 11:
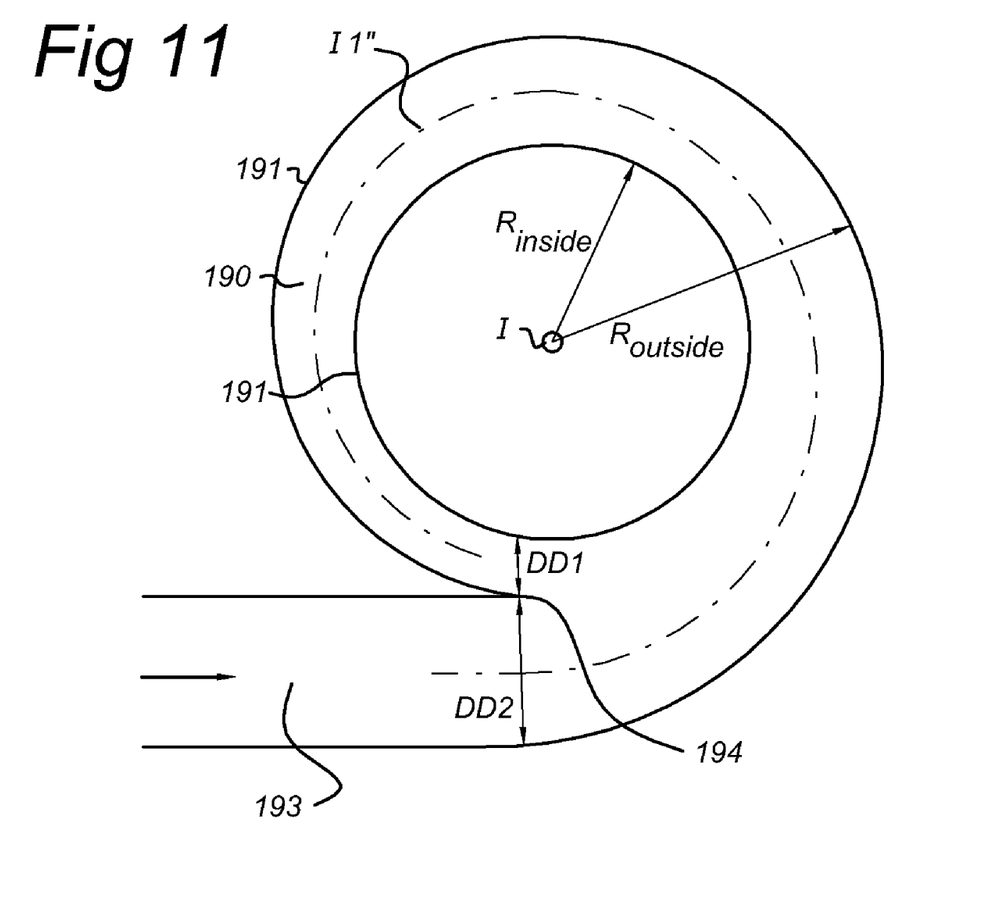

FIG. 10 shows a cyclonic separator according to a further embodiment. FIG. 11 schematically depicts a cross sectional view in the upstream direction of the cyclonic separator along the dashed line shown in FIG. 10. Both FIGS. 10 and 11 schematically show a cyclonic separator according to the one shown in FIG. 1, now further comprising a volute inlet 100.

Volute Inlet

The volute inlet 100 comprises a volute inlet duct 190 that is provided around the central axis I of the cyclonic separator. The volute inlet duct 190 is fed with fluid by an inlet duct 193, which may be a straight duct positioned tangent to the volute inlet duct 190. The volute inlet duct 190 can be described as a torus shaped duct, with a varying cross sectional area, as will be explained in more detail below. The shape of the cross sectional area may be circular, but may also have another suited shape, as will be explained below.

The volute inlet duct 190 is connected to the annular flow path 3 created between the central body 1 and separator housing 20. The volute inlet duct 190 discharges the incoming fluid in a direction tangent to the perimeter of the central body 1 into the converging inlet section of the cyclonic separator to generate a swirling fluid flow around a central axis I.

In the example shown in the figures, the volute inlet duct 190 is a substantially round duct, i.e. it has a substantially circular cross sectional area, where the cross section is taken substantially perpendicular to volute axis I1" of the volute inlet duct 190. In general, the cross sectional area may have any suitable shape, such as a rectangular shape or may have a curved shape such as an elliptical shape or a spiral shape.

The cross sectional area decreases along the volute axis I1" of the volute inlet duct 190 in the direction from the inlet duct 193. In the example shown in FIG. 11, the cross sectional area is characterized by an inner diameter DD of the volute inlet duct 190. The inner diameter DD may increase (e.g. linearly) in the direction of the inlet duct 193 (i.e. in the direction opposite the flow direction), starting at a first inner diameter DD1 being relatively small and resulting in a second inner diameter DD2, which may match the diameter of the inlet duct 193.

At the beginning of the volute inlet duct 190 the volute inlet duct 190 is connected to the inlet duct 193. This connection also substantially coincides with the end of the volute inlet duct 190. At the position where outer perimeter of the wall 191 of the volute inlet duct 190 meets the inlet duct 193, edge 194 is formed. This construction prevents flow from building up at the end of the volute inlet duct 190 and allows part of the flow to flow through the volute inlet duct 190 once more.

As shown in FIG. 11, the volute inlet duct 190 may have an inside radius $R_{inside}$ with respect to the central axis I of the cyclonic separator that is substantially constant and matches the annular flow path 3, and an outside radius $R_{outside}$ with respect to the central axis I of the cyclonic separator that is decreasing in the direction from the inlet duct 193.

The volute inlet duct 190 comprises an opening to allow fluid to flow into the annular flow path 3 created between central body 1 and separator housing 20, conveying the fluid flow to be separated. The opening may be positioned on the inside of the volute inlet duct 190, i.e. at its inner perimeter.

The volute shape of the volute inlet duct 190 ensures that rotational kinetic energy is provided to the fluid flow, making swirl imparting vanes 2 or the like unnecessary. Therefore, this embodiment provides an efficient way of providing the flow with rotational momentum with respect to the central axis I. Axial momentum with respect to the central axis is generated by the pressure of the fluid at the inlet.

The volute inlet duct 190 is formed to make a rotation of substantially 360° around central axis I of the cyclonic separator to allow fluid to enter the annular path 3 along the entire periphery.

So, according to this embodiment there is provided a cyclonic separator comprising a throat portion 4 which is arranged between a converging fluid inlet section and a diverging fluid outlet section, the cyclonic separator being arranged to generate a swirling fluid flow around a central axis I of the cyclonic separator in a downstream direction through the converging fluid inlet section and the throat portion towards the diverging fluid outlet section, the diverging fluid outlet section comprising outlets 6, 7 comprising an inner primary outlet 7 for condensables depleted fluid components and an outer secondary outlet for condensables enriched fluid components 6, the cyclonic separator comprising a volute inlet duct 190 that is connected to the converging fluid inlet section, the volute inlet duct 190 comprising a volute inlet duct 190 defined by a volute axis I1", the volute axis I1" substantially forming a spiral shape around the central axis I to generate the swirling fluid flow. The incoming fluid is laden with solid particles.

The volute inlet 100 may be used in combinations with one or more volute outlets as described above.

Further Remarks

The embodiments as provided have several advantages with respect to the prior art. For instance, the embodiments provide an effective way of transforming kinetic energy into pressure and vice versa.

By providing a volute diffuser the length of the cyclonic separator in the direction of the central axis I can be reduced. By comparing FIG. 1 to FIG. 10 it can be seen that providing a volute inlet reduces the overall length of the cyclonic separator. Accordingly, at the outlet side the length of the cyclonic separator may be reduced as no long outlet constructions are needed to reduce the momentum of the flow, as the volute outlet provides a compact solution for this.

Also, a higher pressure is obtained at the exit of the cyclonic separator, as rotational kinetic energy as well as axial kinetic energy is recovered in an efficient way. Furthermore, possible hold-up of fluid is reduced As an alternative to the embodiments described above, the volute diffuser 9 may instead of one volute outlet duct or volute inlet duct at a certain position along the central axis I, comprise two volute outlet ducts or two volute inlet ducts at that certain position along the central axis I. The two volute outlet ducts may both start at opposite positions, i.e. two positions that are 180° opposite to each other with respect to the central axis I. Both volute outlet ducts spiral in the same direction.

So, instead of one volute outlet duct receiving flow from the total circumference of e.g. the primary of secondary outlet conduit 6, 7, both volute outlet ducts receive flow from substantially half the circumference of e.g. the primary of secondary outlet conduit 6, 7. A similar set-up may, mutatis mutandis, be conceived for the inlet.

The embodiments are all based on the cyclonic separator as shown in FIG. 1. However, it will be understood that similar embodiments can be conceived for other types of cyclonic separators, such as cyclonic separator working at relatively lower pressure or working at subsonic velocities.

Both the inlet as the outlet embodiments have the advantage that the total space needed by the cyclonic fluid separator can be reduced, e.g. the length of the cyclonic separator in the direction of the central axis I, with respect to the embodiment shown in FIG. 1.

It will be appreciated that a reduction of the length has certain advantages. For instance, it makes it easier to prevent or suppress vibrations that may be generated in the cyclonic separator when in use. Especially the central body 1 and the elongated tail section 8 are vulnerable for unwanted vibrations during use. The bending stiffness of such a construction with reduced length is improved. Also, a smaller cyclonic separator saves space when incorporated in a bigger system and therefore provides constructional advantages.

The descriptions above are intended to be illustrative, not limiting. Thus, it will be apparent to one skilled in the art that modifications may be made to the invention as described without departing from the scope of the claims set out below.

The invention claimed is:

1. Cyclonic separator comprising a throat portion (4) which is arranged between a converging fluid inlet section and a diverging fluid outlet section,
the cyclonic separator being arranged to generate a swirling fluid flow around a central axis (I) of the cyclonic separator in a downstream direction through the converging fluid inlet section and the throat portion towards the diverging fluid outlet section,
the diverging fluid outlet section comprising outlets (6, 7) comprising an inner primary outlet (7) for condensables depleted fluid components and an outer secondary outlet for condensables enriched fluid components (6),
the cyclonic separator comprising at least one volute diffuser (9, 9') connected to one of the outlets (6, 7), the at least one volute diffuser (9, 9') comprising a volute outlet duct (90, 90') defined by a volute axis (I1), the volute axis (I1) substantially forming a spiral shape around the central axis (I),
the volute outlet duct (90, 90') comprising a vortex chamber (95), in use the vortex chamber (95) is provided to transform axial momentum of the swirling fluid flow with respect to the central axis (I) into tangential momentum with respect to the volute axis (I1),
characterized in that the cross sectional area of the volute outlet duct (90, 90') increases from a minimal cross sectional area to a maximal cross sectional area, the maximum cross sectional area of the volute outlet duct (90, 90') comprises a passage to the minimal cross sectional area of the volute outlet duct (90, 90').

2. Cyclonic separator according to claim 1, wherein outlets (6, 7) are formed by walls (61, 62; 71, 72) forming an annular area, and the volute outlet duct (90, 90') is formed by a curved wall (91, 91') having a curvature around the volute axis (I1), the vortex chamber (95) being formed by a smooth transition between at least one of the walls (61, 62; 71, 72) of the outlets (6, 7) and the curved wall (91, 91').

3. Cyclonic separator according to claim 1, wherein, in use, the swirling fluid flow has a tangential momentum with respect to the central axis (I) and the volute axis (I1) is substantially directed to match the tangential momentum with respect to the central axis (I).

4. Cyclonic separator according to claim 1, wherein a cross sectional area of the volute outlet duct (90, 90') taken perpendicular with respect to the volute axis (I1) has a shape substantially corresponding with at least part of a circle, an ellipse, a spiral.

5. Cyclonic separator according to claim 1, wherein a cross sectional area of the volute outlet duct (90, 90') taken perpendicular with respect to the volute axis (I1) increases in the downstream direction along the volute axis (I1).

6. Cyclonic separator according to claim 1, wherein the ratio between the minimal cross sectional area and the maximum cross sectional area being at least 1:2.

7. Cyclonic separator according to claim 1, wherein the cyclonic separator comprises a swirl inlet device comprising a pear-shaped central body (1) on which a series of swirl imparting vanes (2) is mounted and which is arranged coaxial to the central axis (I) of the cyclonic separator and inside the cyclonic separator such that an annular flow path (3) is created between the pear-shaped central body (1) and separator housing (20),
the pear-shaped central body (1) having a largest outer width or diameter $2R_{o\ max}$ which is larger than the smallest inner width or diameter $2R_{n\ min}$ of the throat portion (4).

8. Cyclonic separator according to claim 1, wherein the at least one volute diffuser (9, 9') comprises an opening at an inner perimeter of the volute outlet duct (90, 90') to be connected to one of the outlets (6, 7).

9. Cyclonic separator according to claim 1, wherein the connection of the at least one volute diffuser (9, 9') to one of the outlets (6, 7) comprises an annular diffuser (60, 70), the annular diffuser comprising an inner wall (61, 71) and an outer wall (62, 72) forming an annular area in between the inner wall (61, 71) and the outer wall (62, 72), whereby the annular area is increasing in the downstream direction.

10. Cyclonic separator according claim 9, wherein an effective radius of the annular area increases in the downstream direction.

11. Cyclonic separator according to claim 8, wherein the inner wall (61, 71) and the outer wall (62, 72) are formed as part of a cone, the axis of such a cone substantially coinciding with the central axis (I),
the inner wall (61, 71) is at a first angle (β1) with respect to the central axis (I) and the outer wall (62, 72) is at a second angle (β2) with respect to the central axis (I), the first angle (β1) being smaller than or equal to the second angle (β2).

12. Cyclonic separator according to claim 1, wherein the volute duct (90, 90') is connected to an outlet duct (93, 93'), the outlet duct (93, 93') comprising flow straightening means.

13. Cyclonic separator according to claim 1, wherein the volute axis (I1) is provided with a pitch with respect to the central axis (I).

14. Cyclonic separator according to claim 1, wherein the cyclonic separator comprises a volute inlet duct (190) that is connected to the converging fluid inlet section,
the volute inlet duct (190) comprising a volute inlet duct (190) defined by a volute axis (I1"), the volute axis (I1") substantially forming a spiral shape around the central axis (I) to generate the swirling fluid flow.

15. Cyclonic separator according to claim 9, wherein the inner wall (61, 71)
is formed as part of a cone, the axis of such a cone substantially coinciding with the central axis (I),
the inner wall (61, 71) is at a first angle (β1) with respect to the central axis (I) and the outer wall (62, 72) is at a second angle (β2) with respect to the central axis (I), the first angle (β1) being smaller than or equal to the second angle (β2).

* * * * *